L. F. BEYSCHLAG.
HULLING MACHINE FOR CORN.
APPLICATION FILED JULY 18, 1913.
1,116,221.
Patented Nov. 3, 1914.
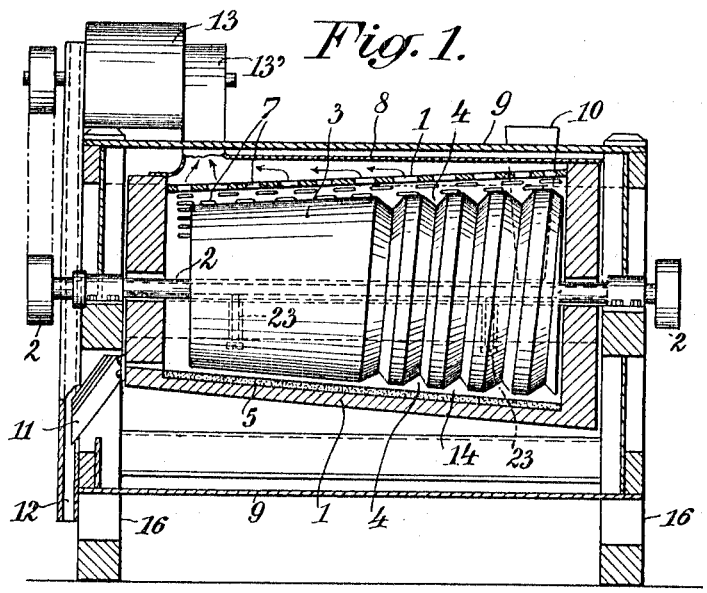
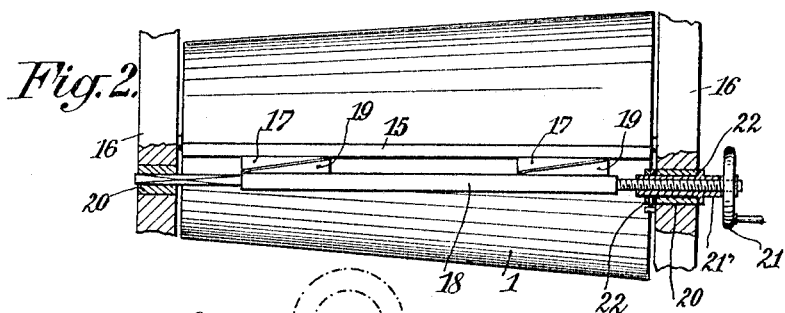
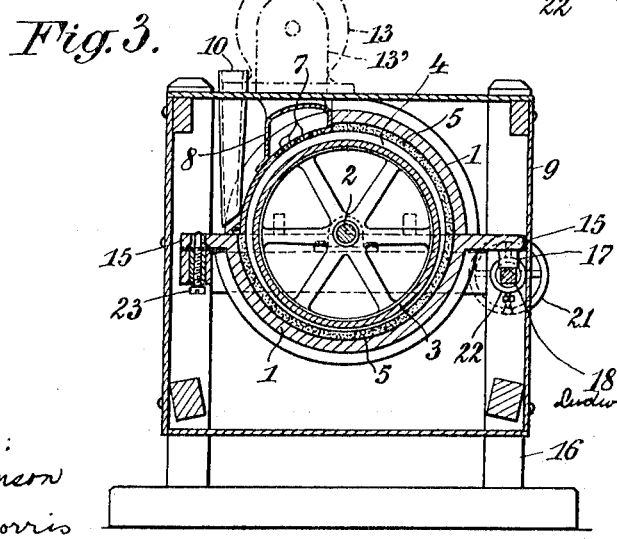
Witnesses:
Elsie Swenson
Isabel Morris
Inventor:
Ludwig Friedrich Beyschlag
by
Attorneys.

UNITED STATES PATENT OFFICE.

LUDWIG FRIEDRICH BEYSCHLAG, OF SANDAU, NEAR LEIPA, AUSTRIA-HUNGARY.

HULLING-MACHINE FOR CORN.

1,116,221.  Specification of Letters Patent.  Patented Nov. 3, 1914.

Application filed July 18, 1913. Serial No. 779,772.

*To all whom it may concern:*

Be it known that I, LUDWIG FRIEDRICH BEYSCHLAG, a subject of the Emperor of Germany, and a resident of Sandau, near Leipa, Bohemia, in the Empire of Austria-Hungary, have invented a Hulling-Machine for Corn; and I do hereby declare the following to be a full, clear, and exact description of the invention, such as will enable others skilled in the art to which it appertains to make and use the same.

My invention relates to that known type of hulling machine for corn, wherein the conical hulling drum, which coöperates with a conical casing and is preferably coated with the same material as is employed for the lining of this casing has helical grooves in order to hull the corn while it is automatically conveyed in the said grooves from the inlet to the outlet of the machine.

My improved machine differs from known machines firstly, in that the conical drum which tapers in the direction of the outlet has helical conveying grooves in about half its length, which grooves are of triangular cross-section and are of a small pitch, the other half of the drum being ungrooved, that is, with an even surface, and secondly, in that the huller jacket is ungrooved, i. e. has also an even surface. Owing to forming the hulling drum in this manner, while the grains received from the hopper are being automatically conveyed they are rotated about their transverse axes in the triangular groove, and, while being simultaneously hulled, are deprived of their sprouts and beards without other auxiliary means being required, and, further, the smooth portion of the drum polishes the grains of corn and deprives them of any dust adhering to them.

One illustrative embodiment of my invention is represented by way of example in the accompanying drawing, wherein:—

Figure 1 is a longitudinal section of the machine, Fig. 2 is a side elevation of a portion of the same, partly in section, and Fig. 3 is a transverse section.

Referring to the drawing, the hulling drum 3 fast on the shaft 2 rotates within the casing 1 and, like the latter, tapers conically toward the outlet of the machine. The drum 3 is eccentrically mounted in the casing 1 in such a manner that the space between the drum and the casing becomes successively smaller toward its lower part. In order to separate the husks removed from the grains, a portion of the upper half of the jacket 1 is formed like a sieve or grid 7 and is bridged over by a piece of dust-proof material 8 fastened at its edge to the casing. A chamber is thus formed between the surface of the casing and the said material, in order to allow the husks to pass through the grid of the casing. Below the suction-duct 13′ of the fan 13 for sucking out the husks this bridge 8 has the form of a tube which is connected to the suction-duct, whereby the fan is connected only with the chamber formed between the grid and the bridge-piece. The dust-flaps hitherto employed in such machines are consequently dispensed with. The entire apparatus can be inclosed in a case 9 in which the inlet 10 and the outlet 11 are arranged. The hulling drum 3 which tapers toward the outlet and is coated with a layer of emery 5 is provided with conveyer grooves 14 which have a small pitch, are made of triangular cross-section, and extend from the inlet up to about half way along the drum 3 whereby the other part of the drum has a smooth surface, the casing which is likewise coated with a layer of emery 5 having a perfectly even surface. As my experiments have proved the triangular form of the conveying groove results in the grains of corn turning or rotating (tumbling over) about their transverse axes, whereby simultaneously with the removal of the husks from the grains their sprouts and beards which hold quantities of dust and dirt are also completely removed; moreover, the grains become perfectly polished and deprived of dust adhering to them on being fed forward by the conveyer groove toward the outlet 11, when they pass between the ungrooved half of the drum 3 and the ungrooved casing coöperating therewith.

The liberated husks and other admixtures, as tips of the grain, dust and the like, are sucked out through the grid 7 by the fan, and blown through a channel, not shown, into the dust-receiver. The fan 13 is also connected on its suction side to the pipe 12 which is connected with the outlet 11, whereby loose particles of husk, which have been carried forward with the grain, and other light particles are sucked away.

In order to be able to regulate the eccentricity between the casing and the drum and thereby the size of the chamber 4 between the inner surface of the casing 1 and the surface of the drum 3, so as to correspond with the size or quantity of the material supplied to the machine, I make the casing adjustable. To this end, I provide both sides of the casing with longitudinal brackets 15, one of which rests on a longitudinal beam of the frame 16, and the other on adjustable members. In the embodiment illustrated, these adjustable members are wedges 17, mounted on the lower side of the bracket 15, which coöperate with oppositely directed wedges 19 on a longitudinally displaceable bar below them. Hence when this bar is displaced in one direction or the other, the jacket is raised or lowered and the chamber for the husks reduced or enlarged. The bar 18, slidable in the supports 20, can be displaced by means of a handwheel 21 whose lengthened hub 21' is journaled in one of the two supports and secured against longitudinal displacement by a collar 22. The hub has an internal thread in which the screw at one end of the bar engages; the other end of the bar is of square section and fits in its support, so securing the bar against rotation. The bar can therefore be displaced in the one or the other direction by the hand-wheel being rotated one way or the other. In order to prevent the drum from being also displaced, bolts 23 can be provided on opposite sides of the frame which engage in holes in the said flange.

What I claim as my invention and desire to secure by Letters Patent is:

1. In a corn-huller, the combination with a frame, of a smooth, conical casing mounted therein, and a conical drum rotatable in said casing, said casing and said drum tapering toward the outlet, said drum having along substantially half its surface a spiral groove of triangular section and of a small pitch, the other half of the surface of said drum being smooth, substantially as described.

2. In a corn-huller, the combination with a frame, of a smooth, conical casing mounted therein, a conical drum rotatable in said casing, said casing and said drum tapering toward the outlet, said drum having along substantially half its surface a spiral groove of triangular section and of a small pitch, the other half of the surface of said drum being smooth, a sieve arranged in the top part of said casing and connected to the suction side of a fan, substantially as described.

3. In a corn-huller, the combination with a frame, of a smooth, conical casing mounted therein, a conical drum rotatable in said casing, said casing and said drum tapering toward the outlet, said drum having along substantially half its surface a spiral groove of triangular section and of a small pitch, the other half of the surface of said conical drum being smooth, a sieve arranged in the top part of said casing, a sheet of dust-proof, flexible material forming outside said sieve a chamber having an outlet, and a fan connected at its suction side to said outlet, substantially as described.

4. In a corn-huller, the combination with a frame, of a smooth, conical casing mounted therein, a conical drum rotatable in said casing and having along substantially half its surface a spiral groove of triangular section and of a small pitch, the other half of the surface of said drum being smooth, said drum being eccentrically mounted in said casing, the space between said drum and said casing being successively smaller toward its lower part, substantially as described.

5. In a corn-huller, the combination with a frame, of a smooth, conical casing mounted therein, a conical drum rotatable in said casing and having along substantially half its surface a spiral groove of triangular section and of a small pitch, the other half of the surface of said drum being smooth, said drum being eccentrically mounted in said casing, the space between said drum and said casing being successively smaller toward its lower part and means for varying the eccentricity of said casing upon said drum, substantially as described.

6. In a corn-huller, the combination with a frame, of a smooth, conical casing mounted therein, a conical drum rotatable in said casing and having along substantially half its surface a spiral groove of triangular section and of a small pitch, the other half of the surface of said drum being smooth, said drum being eccentrically mounted in said casing, the space between said drum and said casing being successively smaller toward its lower part, said casing being fulcrumed at one side on said frame and having at the other side a longitudinal bracket, wedges fast on said bracket, an adjusting bar slidable in said frame below said bracket, wedges mounted on said bar below the wedges of said bracket, and means for longitudinally displacing said bar, substantially as described.

In testimony whereof I have signed my name to this specification in the presence of two subscribing witnesses.

LUDWIG FRIEDRICH BEYSCHLAG.

Witnesses:
PAUL ARRAS,
CLÄRE SIMON.

Copies of this patent may be obtained for five cents each, by addressing the "Commissioner of Patents, Washington, D. C."